United States Patent
Mermoud et al.

(10) Patent No.: US 9,491,076 B2
(45) Date of Patent: Nov. 8, 2016

(54) LEARNING END-TO-END DELAYS IN COMPUTER NETWORKS FROM SPORADIC ROUND-TRIP DELAY PROBING

(71) Applicant: Cisco Technology, Inc., San Jose, CA (US)

(72) Inventors: Grégory Mermoud, Veyras (CH); Jean-Philippe Vasseur, Saint Martin d'Uriage (FR); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 47 days.

(21) Appl. No.: 14/164,781

(22) Filed: Jan. 27, 2014

(65) Prior Publication Data

US 2015/0195171 A1    Jul. 9, 2015

Related U.S. Application Data

(60) Provisional application No. 61/923,910, filed on Jan. 6, 2014.

(51) Int. Cl.

| | |
|---|---|
| *G01R 31/08* | (2006.01) |
| *G06F 11/00* | (2006.01) |
| *H04L 12/26* | (2006.01) |
| *H04W 24/10* | (2009.01) |
| *H04L 12/24* | (2006.01) |
| *G06N 7/00* | (2006.01) |
| *G06N 99/00* | (2010.01) |

(52) U.S. Cl.
CPC ........... *H04L 43/0864* (2013.01); *G06N 7/005* (2013.01); *G06N 99/005* (2013.01); *H04L 41/16* (2013.01); *H04L 43/10* (2013.01); *H04L 43/106* (2013.01); *H04W 24/10* (2013.01)

(58) Field of Classification Search
CPC ..................................................... H04L 47/283
See application file for complete search history.

(56) References Cited

U.S. PATENT DOCUMENTS

| | | |
|---|---|---|
| 6,577,597 B1 | 6/2003 | Natarajan et al. |
| 6,694,471 B1 | 2/2004 | Sharp |
| 6,769,024 B1 | 7/2004 | Natarajan et al. |
| 6,785,239 B1 | 8/2004 | Tasker |
| 6,886,040 B1 | 4/2005 | Fitzgerald |
| 6,961,573 B1 | 11/2005 | Moon et al. |
| 6,973,034 B1 | 12/2005 | Natarajan et al. |

(Continued)

OTHER PUBLICATIONS

Nowak et al. (Network Tomography for internal delay estimation, Department of electrical and computer engineering, Rice university, May 7-11, 2008).*

(Continued)

*Primary Examiner* — Maharishi Khirodhar
(74) *Attorney, Agent, or Firm* — Parker Ibrahim & Berg LLC; James M. Behmke; Stephen D. LeBarron

(57) ABSTRACT

In one embodiment, periodic round-trip probes are executed in a network, whereby a packet is transmitted along a particular communication path from a source to a destination and back to the source. Statistical information relating to the round-trip probes is gathered, and a transmission delay of the round-trip probes is calculated based on the gathered statistical information. Also, an end-to-end transmission delay along an arbitrary communication path in the network is estimated based on the calculated transmission delay of the round-trip probes.

21 Claims, 9 Drawing Sheets

(56) References Cited

U.S. PATENT DOCUMENTS

| | | |
|---|---|---|
| 7,092,410 B2 | 8/2006 | Bordonaro et al. |
| 7,457,877 B1 | 11/2008 | Shah et al. |
| 7,568,045 B1 | 7/2009 | Agrawal |
| 7,606,895 B1 | 10/2009 | Dini et al. |
| 7,613,128 B2 | 11/2009 | Castagnoli et al. |
| 7,680,047 B2 | 3/2010 | Vadlakonda et al. |
| 7,724,676 B2 | 5/2010 | Gerstel et al. |
| 7,948,910 B2 | 5/2011 | Arbel et al. |
| 8,005,000 B1 | 8/2011 | Srinivasan |
| 8,369,213 B2 | 2/2013 | Vasseur et al. |
| 8,605,591 B2 | 12/2013 | Shaffer et al. |
| 8,630,177 B2 | 1/2014 | Vasseur et al. |
| 8,630,291 B2 | 1/2014 | Shaffer et al. |
| 8,634,314 B2 | 1/2014 | Banka et al. |
| 8,638,778 B2 | 1/2014 | Lee et al. |
| 2002/0116154 A1* | 8/2002 | Nowak ............... H04L 12/2697 702/186 |
| 2009/0019147 A1 | 1/2009 | Ahlers et al. |
| 2011/0085461 A1 | 4/2011 | Liu et al. |
| 2012/0075999 A1* | 3/2012 | Ko .................. H04L 43/0858 370/238 |
| 2012/0155475 A1 | 6/2012 | Vasseur et al. |
| 2012/0233308 A1 | 9/2012 | Van De Houten et al. |
| 2012/0307653 A1 | 12/2012 | Vasseur et al. |
| 2013/0022053 A1 | 1/2013 | Vasseur et al. |
| 2013/0022083 A1 | 1/2013 | Vasseur et al. |
| 2013/0024560 A1 | 1/2013 | Vasseur et al. |
| 2013/0028103 A1 | 1/2013 | Hui et al. |
| 2013/0121331 A1 | 5/2013 | Vasseur et al. |
| 2013/0159479 A1 | 6/2013 | Vasseur |
| 2013/0159486 A1 | 6/2013 | Vasseur |
| 2013/0159550 A1 | 6/2013 | Vasseur |
| 2013/0201858 A1 | 8/2013 | Varma et al. |
| 2013/0223229 A1 | 8/2013 | Hui et al. |
| 2013/0250811 A1 | 9/2013 | Vasseur et al. |
| 2013/0336126 A1 | 12/2013 | Vasseur et al. |
| 2013/0336316 A1 | 12/2013 | Sudhaakar et al. |
| 2014/0003277 A1 | 1/2014 | Shim |
| 2014/0022928 A1 | 1/2014 | Zingale et al. |
| 2014/0092753 A1 | 4/2014 | Vasseur et al. |

OTHER PUBLICATIONS

Tao (Data driven link quality prediction using link features, vol. 10, No. 2, article 37, Jan. 2014).*

Fan, N., "Learning Nonlinear Distance Functions Using Neural Network for Regression with Application to Robust Human Age Estimation", IEEE International Conference on Computer Vision (ICCV), Nov. 2011, pp. 249-254, Institute of Electrical and Electronics Engineers, Barcelona, Spain.

Fortunato, S., "Community Detection in Graphs", arXiv:0906.0612v2.pdf [physics.soc-ph]; Physics Reports 486, 75-174, Jan. 2010, 103 pages.

Hui, et al., "An IPv6 Routing Header for Source Routes with the Routing Protocol for Low-Power and Lossy Networks (RPL)", Request for Comments 6554, Mar. 2012, 13 pages, Internet Engineering Task Force Trust.

Newman, et al., "Modularity and Community Structure in Networks", Proceedings of the National Academy of Sciences of the United States of America, Jun. 2006, vol. 103, No. 23, pp. 8577-8582, PNAS, Washington, DC.

Newman, M. E. J., "Analysis of Weighted Networks", http://arxiv.org/pdf/condmat/0407503.pdf, Phys. Rev. E 70, 056131, Jul. 2004, 9 pages.

Siddiky, et al., "An Efficient Approach to Rotation Invariant Face Detection Using PCA, Generalized Regression Neural Network and Mahalanobis Distance by Reducing Search Space", 10th International Conference on Computer and Information Technology, Dec. 2007, 6 pages, Dhaka, Bangladesh.

Ting, et al., "Variational Bayesian Least Squares: An Application to Brain-Machine Interface Data", Neural Networks, vol. 21, Issue 8, Oct. 2008, pp. 1112-1131, Elsevier.

Vasseur, et al., "Routing Metrics Used for Path Calculation in Low-Power and Lossy Networks", Request for Comments 6551, Mar. 2012, 30 pages, Internet Engineering Task Force Trust.

Vasseur, et al., "Learning-Machine-Based Predictive and Proactive Computer Networking and Associated Monitoring", U.S. Appl. No. 61/923,910, filed Jan. 6, 2014, 105 pages, U.S. Patent and Trademark Office, Alexandria, VA.

Winter, et al., "RPL: IPv6 Routing Protocol for Low-Power and Lossy Networks", Request for Comments 6550, Mar. 2012, 157 pages, Internet Engineering Task Force Trust.

International Search Report dated Apr. 24, 2015 issued in connection with PCT/US2015/010152.

Tao Liu et al.: "Data-driven link quality prediction using link features," ACM Transactions on Sensor Networks, vol. 10, No. 2, Jan. 1, 2014, pp. 1-35.

Nouha Baccour et al.: "Radio link quality estimation in wireless sensor networks," ACM Transactions on Sensor Networks, vol. 8, No. 4, Sep. 1, 2012, pp. 1-33.

Yolanda Tsang et al.: "Network Radar: Tomography from Round Trip Time Measurements," Proceedings of the 4th ACM SIGCOMM Conference on Internet Measurement, IMC '04, Jan. 1, 2004, p. 175.

Eduardo Feo Flushing et al.: "A mobility-assisted protocol for supervised learning of link quality estimates in wireless networks," 2012 International Conference on Computing, Networking and Communications (ICNC), IEEE, Jan. 30, 2012, pp. 137-143.

* cited by examiner

A BAYESIAN NETWORK REPRESENTING THE JOINT PROBABILITY DISTRIBUTION OVER THREE RANDOM VARIABLES; X, Y, AND Z

BN FOR LINEAR REGRESSION

LEARNING END-TO-END DELAYS IN COMPUTER NETWORKS FROM SPORADIC ROUND-TRIP DELAY PROBING

RELATED APPLICATION

This application claims priority to U.S. Provisional Application No. 61/923,910, filed Jan. 6, 2014, entitled: LEARNING-MACHINE-BASED PREDICTIVE AND PROACTIVE COMPUTER NETWORKING AND ASSOCIATED MONITORING, by Vasseur, et al., the contents of which are herein incorporated by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and performance indicators), and recognize complex patterns in these data. In general, these patterns are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning Machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
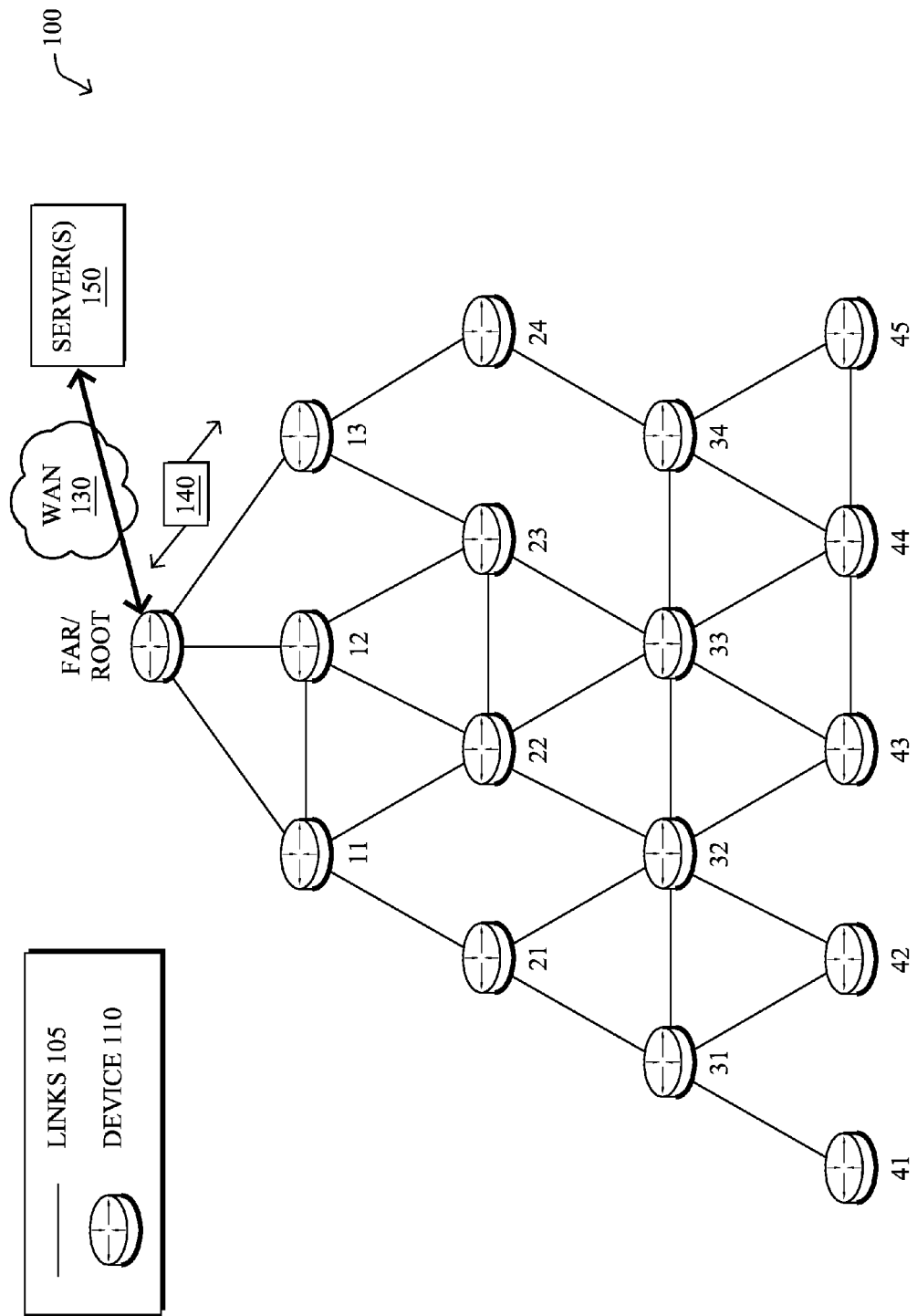
FIG. 1 illustrates an example communication network.

According to one or more embodiments of the disclosure, periodic round-trip probes are executed in a network, whereby a packet is transmitted along a particular communication path from a source to a destination and back to the source. Statistical information relating to the round-trip probes is gathered, and a transmission delay of the round-trip probes is calculated based on the gathered statistical information. Also, an end-to-end transmission delay along an arbitrary communication path in the network is estimated based on the calculated transmission delay of the round-trip probes.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
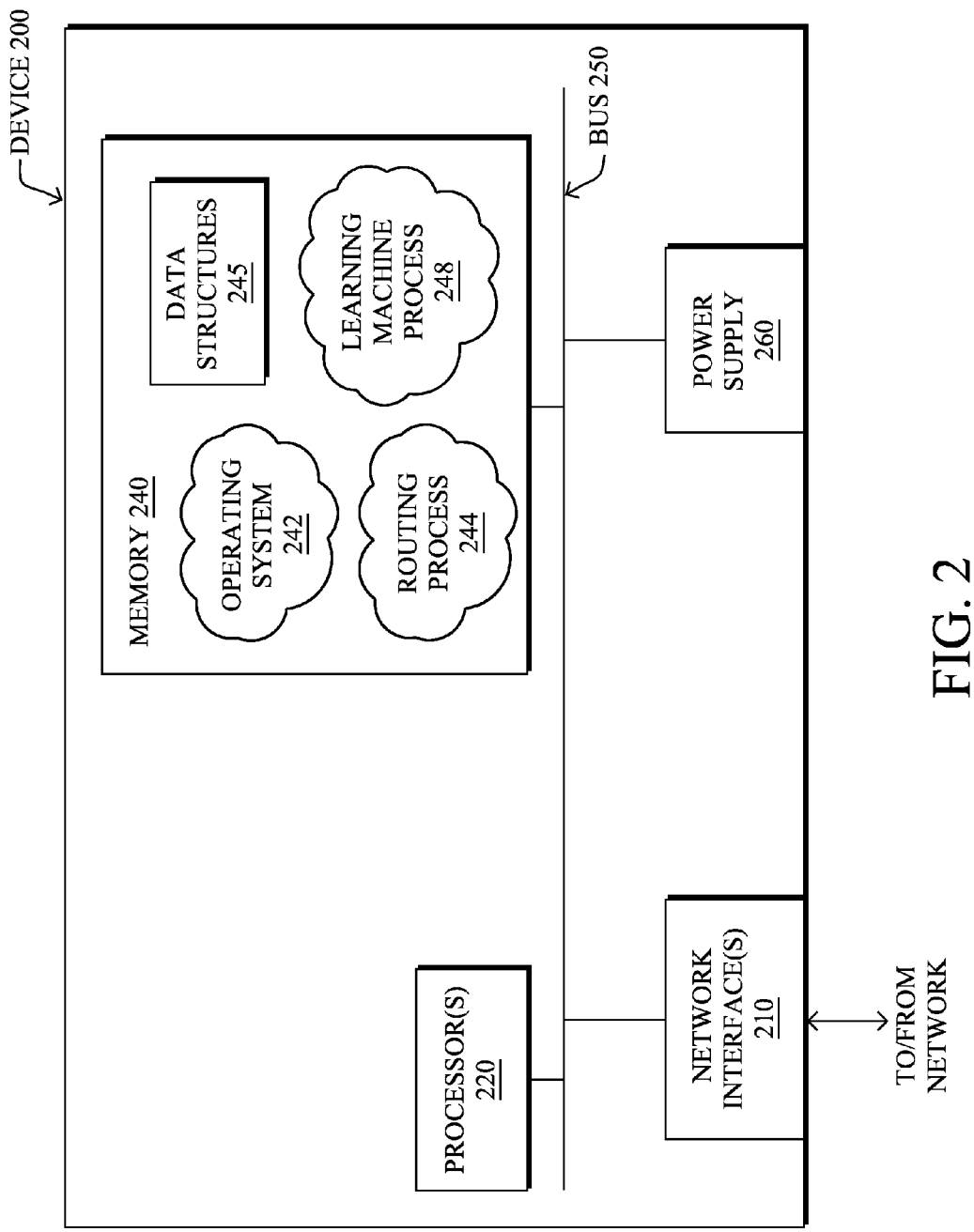
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
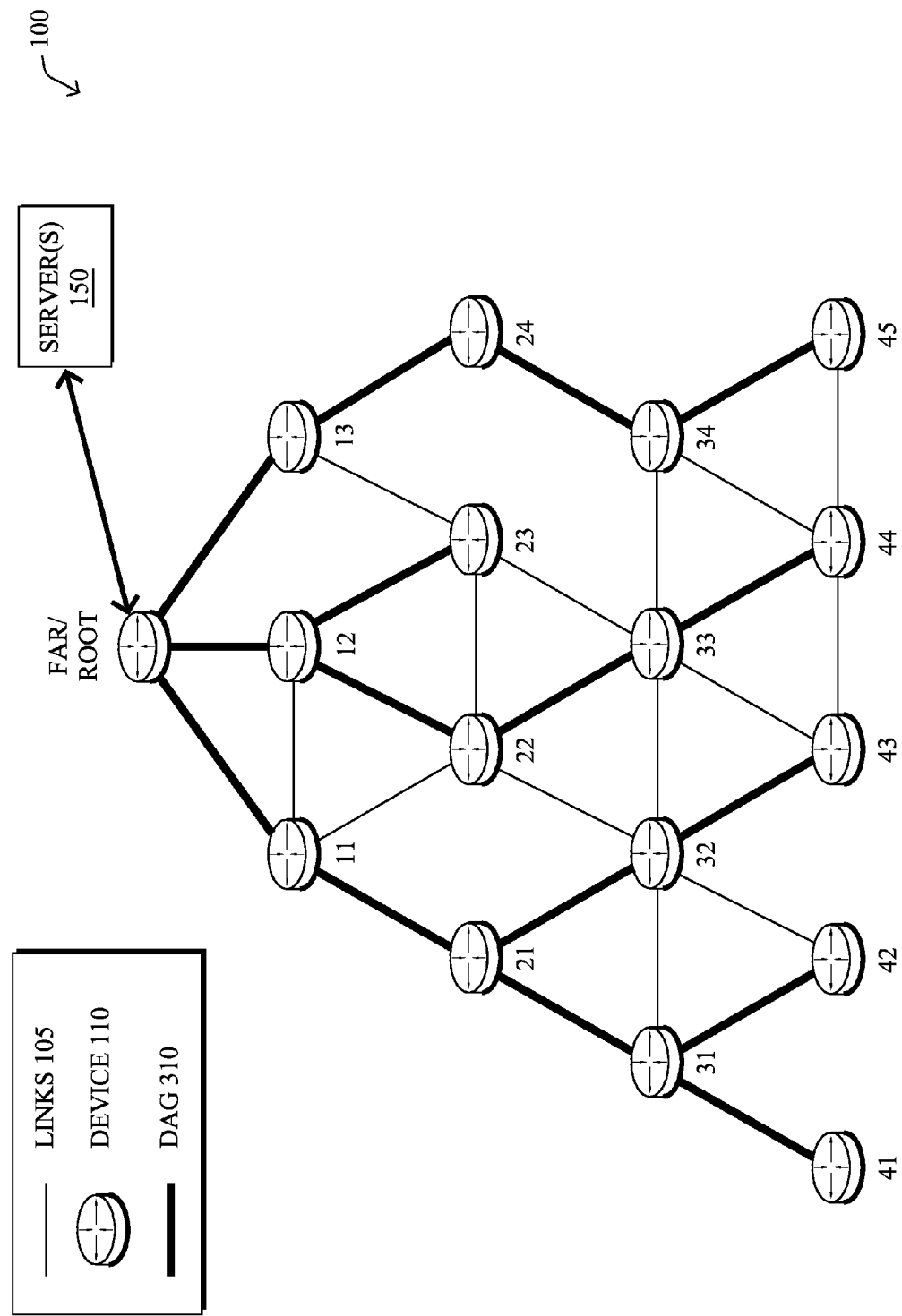
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

RPL supports two modes of operation for maintaining and using Downward routes:

1) Storing Mode: RPL routers unicast DAO messages directly to their DAG Parents. In turn, RPL routers maintain reachable IPv6 addresses for each of their DAG Children in their routing table. Because intermediate RPL routers store Downward routing state, this mode is called Storing mode.

2) Non-Storing Mode: RPL routers unicast DAO messages directly to the DAG Root. The DAO message also includes the IPv6 addresses for the source's DAG Parents. By receiving DAO messages from each RPL router in the network, the DAG Root obtains information about the DAG topology and can use source routing to deliver datagrams. Unlike Storing mode, intermediate RPL routers in Non-Storing mode do not maintain any Downward routes.

Learning Machine Technique(s)

As noted above, machine learning (ML) is concerned with the design and the development of algorithms that take as input empirical data (such as network statistics and performance indicators), and recognize complex patterns in these data. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

In particular, many LMs can be expressed in the form of a probabilistic graphical model also called Bayesian Network (BN). A BN is a graph G=(V,E) where V is the set of vertices and E is the set of edges. The vertices are random variables, e.g., X, Y, and Z (see FIG. 4) whose joint distribution P(X,Y,Z) is given by a product of conditional probabilities:

$$P(X,Y,Z)=P(Z|X,Y)P(Y|X)P(X) \quad (\text{Eq. 1})$$

Figure 4:
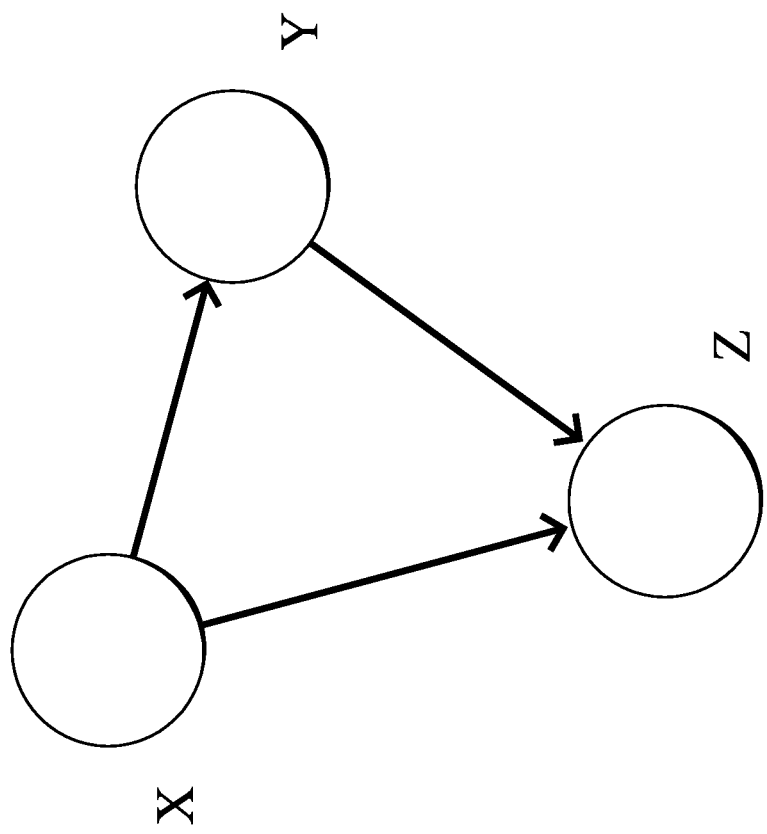
FIG. 4 illustrates an example Bayesian network.

The conditional probabilities in Eq. 1 are given by the edges of the graph in FIG. 4. In the context of LMs, BNs are used to construct the model M as well as its parameters.

To estimate the relationship between network properties of a node I (or link), noted $x_i$, (e.g., hop count, rank, firmware version, etc.) and a given networking metric $M_i$, a linear regression may be performed. More specifically, given the following equation:

$$M_i=F(x_i)=b^T x_i+\epsilon \quad (\text{Eq. 2})$$

where $x_i$ is a d-dimensional vector of observed data (e.g., end-node properties such as the rank, the hop count, the distance to the FAR, etc.) and $M_i$ is the target metric (e.g., the time to join the network), which is also noted $y_i$ sometimes. Building such a model of a performance metric knowing a set of observed features is critical to perform root cause analysis, network monitoring, and configuration: for example the path delay as a function of the node rank, link quality, etc., can then be used to determine whether anomalies appear in the network and thus take some appropriate actions to fix the issue. In the equation (Eq. 2) above, the term $\epsilon$ is a Gaussian random variable used to model the uncertainty and/or the noise on the estimate $M_i$. The linear regression consists in finding the weight vector b that fulfills the maximum likelihood criterion (which coincides with the least square criterion when $\epsilon$ is Gaussian). In particular, the optimal b must minimize the Mean Squared Error (MSE):

$$\text{MSE}=\Sigma_i(b^T x_i-y_i)^2/N \quad (\text{Eq. 3})$$

where N is the total number of input data points, i.e., i=1, . . . , N.

In other words, b is a set of weights for each observed value $x_i$, used to compute the function F that provides the value of F. The MSE is a metric used to compute the "quality" of the model function F.

The usual approach to the solving of Eq. (2) is the ordinary least square (OLS) equation, which involves a "d×d" matrix inversion, where d is the number of dimensions. Three main problems arise immediately: (i) the dimensionality of $x_i$ may be large, thus making OLS prohibitively expensive in terms of computational cost (approximately $O(d^3)$), (ii) in presence of co-linearity (i.e., when several node properties are strongly correlated, as it is the case for the hop count and the ETX, for instance), OLS becomes numerically unstable (i.e., round-off and truncation errors are magnified, causing the MSE to grow exponentially), (iii) OLS being essentially non-probabilistic (i.e., it doesn't account for the whole distribution of its constituent variables, but it merely tracks averages), it cannot cope well with noise and outliers, and it is simply not applicable when $\epsilon$ is not Gaussian.

Figure 5:
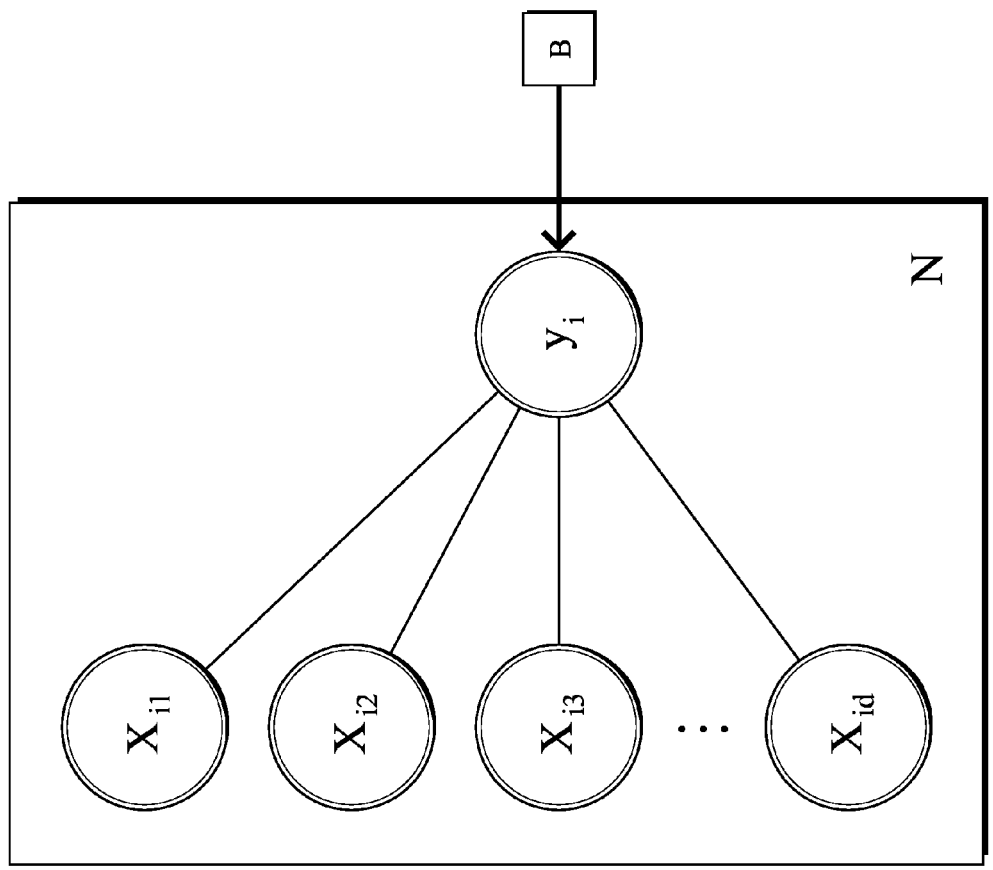
FIG. 5 illustrates an example Bayesian network for linear regression.

To overcome these limitations, the problem can be formulated as a BN (see FIG. 5). Now, all variables are considered as random variables, even though they are all observed at this point: both input variable $x_i$ and the output variable y, are experimental data, and b is a (non-probabilistic) parameter of the BN at this point. By pushing this approach a little bit further, one may turn b into a random variable as well, and attempt to infer it from experimental data (that is, the observations of $x_i$ and $y_i$). However, this inference problem is non-trivial, especially as one desirable feature of this learning algorithm is that it is capable of identifying non-relevant dimensionalities of x (that is, input dimensions that are weakly correlated with the output x), and automatically set the corresponding weights in b to a zero (or a very small) value.

This problem is solved by one recently proposed algorithm called Variational Bayes Least Square (VBLS) regression (Ting, D'Souza, Vijayakumar, & Schaal, 2010). Namely, this algorithm allows for efficient learning and feature selection in high-dimensional regression problems, while avoiding the use of expensive and numerically brittle matrix inversion. VBLS adds a series of non-observed random variables $z_{ij}$ that can be considered as noisy, fake targets of the factor $b_j \cdot x_{ij}$, and whose sum $\Sigma_j z_{ij}$ is an estimate of $y_i$. In turn, the weights $b_j$ are modeled as random variables, thereby allowing for automated feature detection, i.e., the mean of $b_j$ converges rapidly to zero if no correlation exists between the various $x_{ij}$ and $y_i$.

VBLS estimates the distribution of the non-observed variables $z_i$ and b using a variant of the Expectation Maximization algorithm with a variational approximation for the posterior distributions, which are not analytically tractable. Because it is a fully Bayesian approach, VBLS does not require any parameterization, except for the initial (prior) distributions of hidden parameters, which are set in an uninformative way, i.e., with very large variances that lead to flat distributions.

Learning End-to-End Delays in Computer Networks from Sporadic Round-Trip Delay Probing For the past two decades or so, the paradigm for service level agreement (SLA) monitoring consisted in 1) designing a network in light of the required SLA for the set of deployed application, 2) Monitoring the network in order to see whether or not the SLA were met, and then 3) readjusting the network design accordingly when needed. For example, Service Providers have been collecting statistics/prediction or traffic flow, perform network provisioning and performance tuning using a variety of tools to predict the required capacity, design the network topology, tune various protocol parameters (routing metrics, set of MPLS TE LSPs, etc.). In some cases, on-demand provisioning were used thanks to technologies such as (G)MPLS combined with a Path Computation Element to set up specific TE LSPs, Optical path, etc. in light of near "real-time" demands.

Such an approach is not only extremely cumbersome, but it exhibits a poor scalability. Even more importantly, it requires deep technology expertise from the end-user. Furthermore, verifying SLAs is extremely costly (imposes a large traffic overhead) requiring the use of probing mechanisms such as IP SLA whereby tagged probes are generated among a set of meshed end-points. With the deployment of ultra large scale LLNs in the context of the Internet of Things, one of main issue is to obtain reliable and lightweight probing mechanisms that can estimate not only the round-trip delay between the FAR and a node in the network, but the end-to-end delay between any pair of nodes in the network. Note that this is also true for Enterprise WAN optimizations where sending probes is costly (for example, to select among a set of potential WAN link candidates).

An aim of the techniques herein, therefore, is to provide a mechanism for learning the end-to-end delay along any arbitrary path in the network from a set of sporadic round-trip delay probes generated by the FAR. In addition, obtaining time-stamps from packets in turn allows computation of one-way delays. To this end, the techniques herein propose a Learning Machine (LM) based on the well-known Expectation-Maximization (EM) algorithm, which infers the delay imposed by each link along a path even though it may never observe the exact link-wise delay, but only the round-trip time (RTT) delay along this path.

Said differently, the techniques herein introduce an LM-based approach for inferring the end-to-end delay of arbitrary paths in a network based on a sample of round-trip delays collected from a central entity. The illustrative algorithm uses an expectation-maximization scheme, which uses an underlying regression model for estimating the delay of any link in the network based on a set of characteristic network properties. In turn, the regression model is trained by adjusting its own estimates such that it matches the measured delays. The techniques herein also specify a mechanism whereby nodes can be probed in a way to speed up the learning process, either by selecting the next node to probe in an optimal fashion or by triggering mechanisms for probing specific segments of the network in a more granular fashion. Finally, the techniques herein specify mechanisms for allowing the entity that collects the round-trip delays and the LM itself to be located in different regions of the network (i.e., different appliance or in the cloud).

Figure 6:
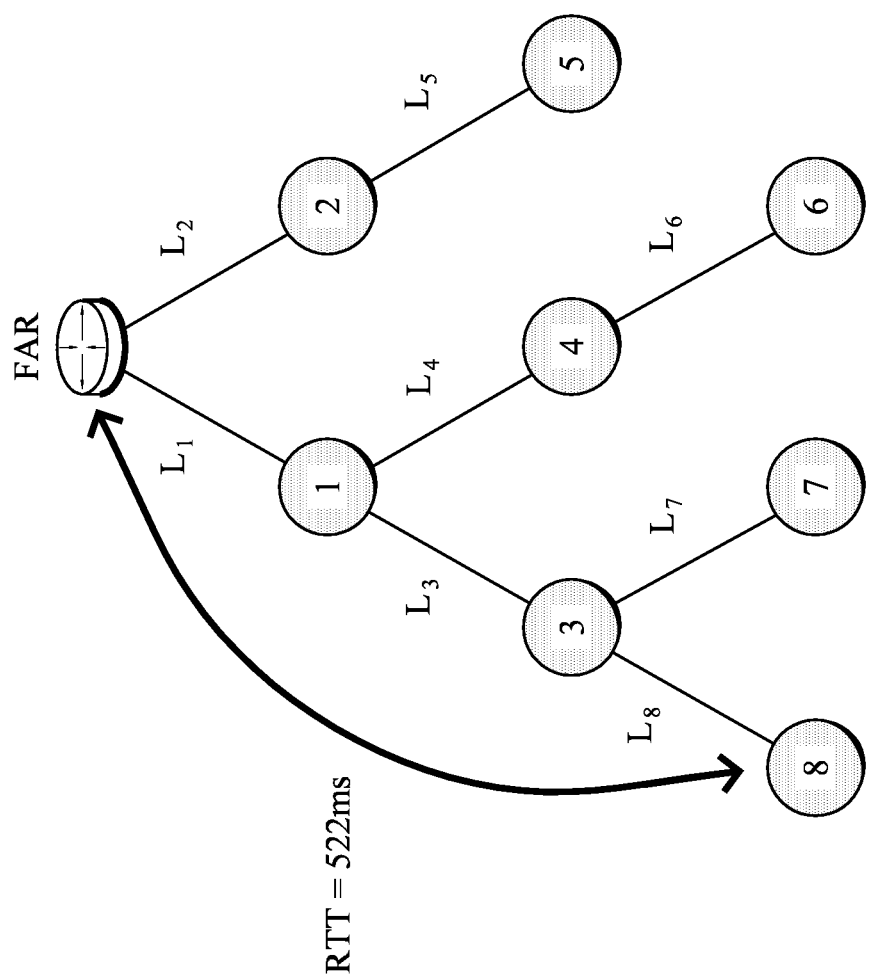
FIGS. 6-8 illustrate an example of learning end-to-end delays in computer networks from sporadic round-trip delay probing.
Figure 7:
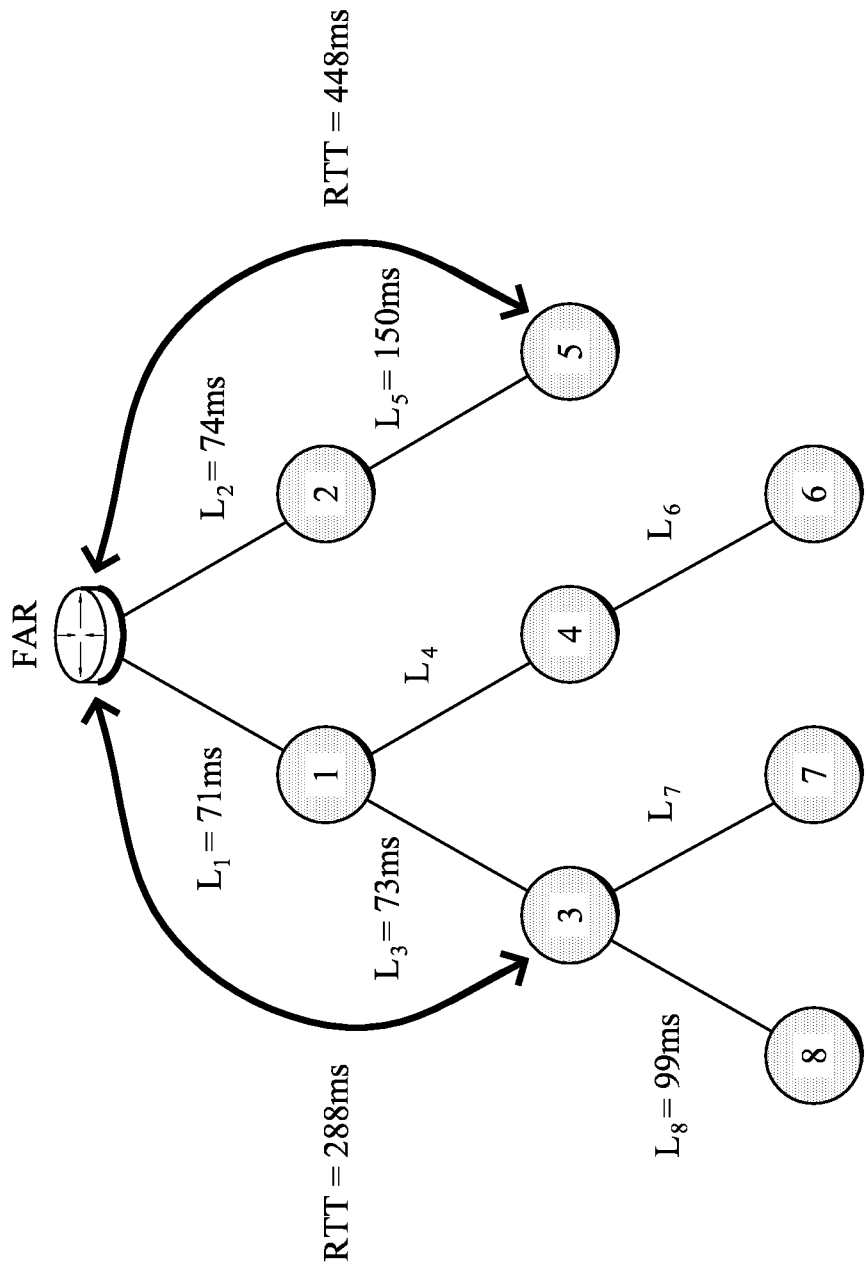
Figure 8:
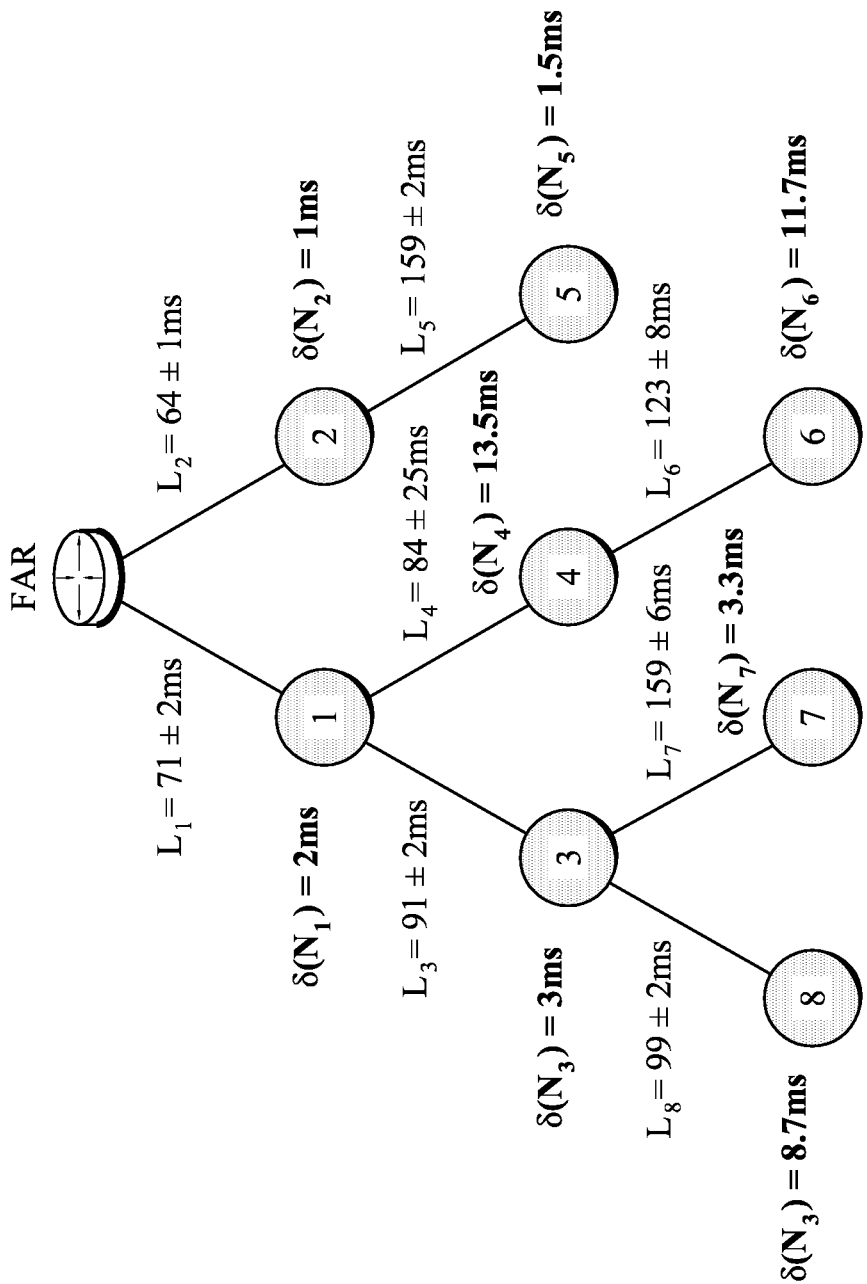

Operationally, as shown in (and with general reference to) FIGS. 6-8, the first component of the techniques herein is a Learning Machine (LM) hosted on a central entity (e.g., typically the FAR or the NMS) that infers the delay of each link in a LLN from a sample Q1, . . . , QN of round-trip time (RTT) delays between the entity and the end nodes. These values could have been obtained either using probes or using timestamps from the packets themselves. Hereafter the techniques herein assume that this central entity is the DAG root, that is, the FAR. That being said, from an architecture standpoint, although RTT Qi may be obtained between the entity hosted on the FAR and remote nodes, the LM computing link-wide delays may be hosted on the FAR itself but alternatively on a network controller that may be in situ or in the cloud.

As an illustrative example, consider a LLN with eight nodes N1, . . . , N8 (FIG. 6). The FAR sends a probe to N8, which is written RTT(N8)=522 ms. Now, based on this, the techniques herein infer the delay between N1 and N3. One simple and naive approach would be to assume that the delay of each link along the round-trip path between the FAR and N8 is identical, therefore the delay between N1 and N3 is simply 522 ms/6=87 ms (indeed, there are six links in the round-trip path between the FAR and N8). Needless to say that deriving link delays from a collection of RTT-probes along the path similarly to Trace route (FAR-N1, then FAR-N3) would be much too costly.

The fundamental problem with the above approach is the premise that the link-wise delay is uniform across the whole network, which has proven to be an incorrect assumption in LLNs, by contrast with optical networks (at least when not spread across large distance). Obviously, this is not the case, as this delay depends on many parameters, such as the signal strength, the distance between the nodes, the amount of traffic, the number of retransmissions at the MAC layer, node processing delays (not negligible in LLNs), environmental effects, etc. As a result, a new approach is required to predict the delay imposed by a link keeping in mind these factors. Such a requirement comes from the fact that using a large set of probes to compute link-wise delays, or gathering local link delays via network management is extremely costly. Furthermore, predicting the delay between two arbitrary end-points would require with the RTT probe-based approach to effectively send probes between two nodes, which is not possible.

In the techniques herein, a regression algorithm is used, as described above. In one embodiment, the regression algorithm could be the Variational Bayesian Least Squares (VBLS) method, but the techniques herein are completely agnostic to the actual method being used for performing the regression. Hereafter, we will simply refer to the regression as a function f(*) that maps a vector of network properties $x_i$ (called a feature vector in machine learning terminology where a feature can be a link delay, type of nodes, traffic load, etc.) to an expected delay $Q_{expi}$ for the link Li, such that $f(x_i)=Q_{expi}=Q_{truei}+epsilon$ where epsilon is an error term that shall be minimized by the regression algorithm. Such properties may be obtained by the FAR via DPI or CoAP packets sent to the NMS by the nodes and/or explicit probing of the nodes and/or DPI of routing control packets sent to the FAR.

Thanks to the techniques herein, it would become possible to relax the assumption that the link-wise delay is uniform across the whole network. Back to the example in FIG. 6, one can write:

$$RTT(N8)=f(x1)+f(x3)+f(x8)+f(x8)+f(x3)+f(x1)+epsilon=2*f(x1)+2*f(x2)+2*f(x8)+epsilon.$$

(For now with the viable assumption that delays are symmetrical.)

Consequently, the delay between N1 and N3 is given by the delay of link L3, which can be written either:

$$delay=f(x3)+epsilon \qquad (Eq.\ 1); or$$

$$delay=RTT(N8)/2-f(x1)-f(x8)+epsilon \qquad (Eq.\ 2).$$

Now there are two, potentially contradictory, ways of estimating the delay of L3. On one hand, one may simply use the value f(x3) predicted by the regression; this is however possible only if the regression has been properly trained. On the other hand, one may use the measured RTT delay to N8 and subtract the estimated delay of all other links along the path; this is possible only if probes have been collected. The Expectation-Maximization (EM) algorithm solves this apparent chicken-and-egg problem. EM is a class of iterative algorithms for finding maximum likelihood estimates of parameters in statistical models. Here, the statistical model is the regression function f(*), and the techniques herein alternate expectation steps (where the techniques herein compute the predicted, or expected, delay of each link along a given path for which there exists a measured RTT delay) and maximization steps (where the techniques herein apply Equation Eq. 2 for each link along the said path in order to train the underlying regression model).

More formally, an illustrative algorithm is as follows:

---
- Algorithm 1 -
---
```
while true
    Send probe to node i
    Let rtt_i be the measured RTT delay
    // Estimation step
    rtt_hat = 0
    for each link j in path(i)
        Compute feature vector x_j characterizing link j
        Estimate link-wise delay d_j = f(x_j)
        rtt_hat = rtt_hat + d_j
    end
    // Maximization step
    factor = rtt_i / rtt_hat
    for each link j in path(i)
        Compute target delay t_j = factor * d_j
        Train regression with mapping f(x_j) -> t_j
    end
end
```
---

Note that, for the sake of simplicity, the techniques herein assumed here that links are symmetrical, i.e., the delay is the same in both directions. However, in many cases (e.g., IEEE 802.15.4), this assumption is invalid. The algorithm above trivially supports asymmetric links: it is sufficient that the feature vectors xi reflect this asymmetry.

There are networks where specific link delays may be available. Although such a situation is not the common case, in heterogeneous networks mixing different types of links (WiFi, 15.4, PLC) and nodes (battery operated, main powered), it happens to have links enabled with local link management functionalities that provide accurate link delays (such mechanisms were used years ago in Service Providers networks, whereby prior to enabling an optical link, probes where sent back and forth between a pair of LSR in order to compute the propagation delay, which could then be used to statically set a routing metrics for the link, for example in the case of Traffic Engineering networks). To that end, in presence of an entity collecting RTT, the techniques herein specify a newly defined broadcast IPv6 message (e.g., a CoAP message in the case of LLN or alternatively SNMPv3) that indicates that nodes capable of reporting actual link delays should send reports back to the entity. In another embodiment, such a request could be piggybacked in the routing protocol (e.g., using a newly defined Flag in the DIO message of the RPL protocol for example). In another embodiment, nodes may be informed of such a request upon NMS registration or during DHCP address allocation. Then, nodes may send information (link delays) back to the requesting entities, either on a regular basis or when previously reported values are updated by a configurable factor.

Upon receiving actual locally estimated delays, such delays di are flagged by the LM-based link-wise estimation algorithm.

Hereafter, the description provides an intuitive explanation of how the algorithm infers the link-wise delay from a round-trip delay. First note that there are two distinct components that work in parallel in our algorithm: (i) a regression model which maps properties of a link to its expected delay, and (ii) a meta-algorithm that makes use of the regression model to transform round-trip delays into link-wise delays. The fundamental idea behind this second component is to compare the length of paths that share common links: their difference in length must be attributed to links they do not share. By comparing many such paths, one may infer which links are longer and which are shorter. Now, the algorithm here relies on a similar reasoning: if two paths that share similar links lead to significantly different RTT delays, the difference must be attributed to the links that are different among them. The regression is the tool the algorithm uses to figure out which links are similar (i.e., they yield the same predicted delay), and which are different (i.e., they yield different predicted delays). In FIG. 7, two paths with round-trip delays of 288 ms and 448 ms, respectively, have similar links L1, L2 and L3 (with an actual delay around 72 ms) while the links L5 is unique (with an actual delay of 150 ms). Of course, at first, the LM is unaware of the actual link-wise delays. Hence, it sends a probe to N3, whose path contains links L1 and L3. In absence of good estimates, it will assign a delay of 72 ms to them (remember that they contribute twice to the delay difference, once in the downstream direction and once in the upstream direction). Later, when sending a probe to N5, the algorithm will attribute the difference of 220 ms to those links that differ among the two paths, which in this case is L5. Indeed, if the difference can be explained by a factor captured in the feature vector x5 (say, a low RSSI), the regression model f(*) can adjust itself in order to account for this difference observed in round-trip delays. In the next estimation step, any link in the network that exhibits a low RSSI will be predicted with a slightly higher delay, thereby accounting better for a higher RTT delay, and reinforcing this tendency in the underlying link-wise prediction model f(*). The fact that probes are not sent in parallel, but often with time differences in the order of several minutes, is accounted for by the fact that the algorithm does not assume a correlation in time, but rather a correlation in feature space. What matters to the algorithm is that the delay imposed by a given link depends on the network properties that characterize this link.

The performance of the algorithm herein converges significantly faster and its asymptotical performance is better than a mere linear regression on RTT delays in spite of the increased complexity and uncertainty. This improvement can be explained by two main reasons: (i) more data are available to the algorithm because each RTT delay is associated to N×M features, where M is the number of features of a single link and N is the number of links in the path; and (ii) non-linear effects are better captured owing to the higher dimensionality of the input data (again, the dimensionality is N×M rather than just M).

The second component of the techniques herein exploits the probabilistic nature of the regression function to guide the probing of the network, i.e., to decide which node to probe next. Indeed, some nodes may be more interesting to probe than others (they are nodes of "relative importance"), in order to speed up the convergence of the algorithm (i.e., some paths bring more information to the probabilistic model than others). When using a Bayesian regression method such as VBLS, one may not only obtain an estimated delay, but also a confidence interval on the estimation. In other words, we have:

$$f(xi) = Q\text{exp}i +/- \text{delta}(xi)$$

where delta(xi) is a term that denotes the uncertainty on the estimate Qexpi.

A basic approach for guiding the probing is to select the node Ni whose round-trip path has the largest average uncertainty delta(Ni), where delta(Ni) is the average of delta(xj) for all links Lj on the round-trip path to Ni. Using this simple approach, the techniques herein will send a probe that maximizes the amount of information gained by the regression model (or, conversely, that minimizes the uncertainty). In another embodiment, a different approach can be taken to compute delta(Ni) coupled with physical and topological locations. For example, delta(xj) from only the parents of large sub-DAGs can be picked, or delta(xj) from nodes only a certain hop-count away can be picked. In yet another embodiment, delta(Ni) can be selected from a range of values that are applicable only during certain times of the day. As this component deals with probing policies, several embodiments can arise related to which nodes are probed.

More generally, given any probabilistic model P(Q|xj) of the expected link-wise delay of a link Li given its feature vector xj, the techniques herein may compute the expected reduction in entropy (or, conversely, gain in information) for probing a given node Ni, which can be written as E[δ(Ni)]. Then, the techniques herein probe the node that maximizes this quantity, as illustrated in FIG. 8.

The third component of the invention is a heuristic to tune the rate of the probing. Quite intuitively, if the overall uncertainty decreases, the rate of probing can be safely reduced. At the beginning, the uncertainty is very large, and therefore the rate of probing shall be very high. As a simple heuristic, the techniques herein propose to make the waiting time Twait between two probes a function that is inversely proportional to the average uncertainty delta_avg (computed by averaging delta(xj) over all links Lj in the network). As an illustration, the techniques herein propose the following function:

$$Twait=Tmin+Tmax/(1+\exp[delta0-delta\_avg])$$

Using this heuristic, the rate of probing lies in the interval [Tmin, Tmax], with a value of (Tmin+Tmax)/2 for delta_avg=delta0, the threshold uncertainty. Embodiments related to timing can be such that they are probed only on certain control plane events or periodic in nature where they are probed after a specific period of time. Similarly, in another embodiment, nodes that are closer to the root can be probed much more regularly than nodes farther away in the DAG.

The fourth component of the techniques herein is a mechanism whereby the LM may request a more granular information about the delay of the links. In particular, when the overall confidence of the LM is high (i.e., the uncertainty delta_avg is low), probes that are incorrectly predicted (i.e., they fall outside a given confidence interval of the predicted delay distribution) may indicate that either (i) the network conditions are changing rapidly and the model isn't learning fast enough, or (ii) this particular path contains specific links that are not properly predicted. In such cases, one may either trigger a more detailed probing by measuring the link-wise delay explicitly (if such a mechanism is available). If not possible, the LM may override the regular probing process described above, and specifically probe RTT delays of the nodes along the path. In either case, the algorithm would benefit dramatically from such data, and rapidly converge to a more accurate solution. Thus, for links with high values of delta_avg, the techniques herein specify a newly defined unicast IPv6 message that is sent to either both end of the request for which a locally delay estimate is required or one end if the link has bi-directional properties in terms of delays, requesting a local estimate (which can be expressed as a single scalar, an average over a set of N local probes, etc.).

The fifth component of the techniques herein relates to the case where the entity collecting the RTT delays and the LM computing link wise delays, are not co-located. As already pointed out, the LM may be hosted in a controller (separate appliance in situ or in the cloud). In such a situation, the techniques herein specify a newly defined IPv6 message sent by the RTT collecting entity (that may also collect locally measured delay when available) and the LM; such a message would specify the list of measured RTT and link delays (not estimated but when available, measured delays). In return, the techniques herein specify a newly defined IPv6 unicast message sent by the LM estimating the link-wise delays using the algorithm specified in this invention to either the FAR, the user or the NMS, that carried out: 1) Indication of the algorithm used for link-wise estimate; 2) List of estimate link delays potentially augmented with level of confidence delta_avg.

Figure 9:
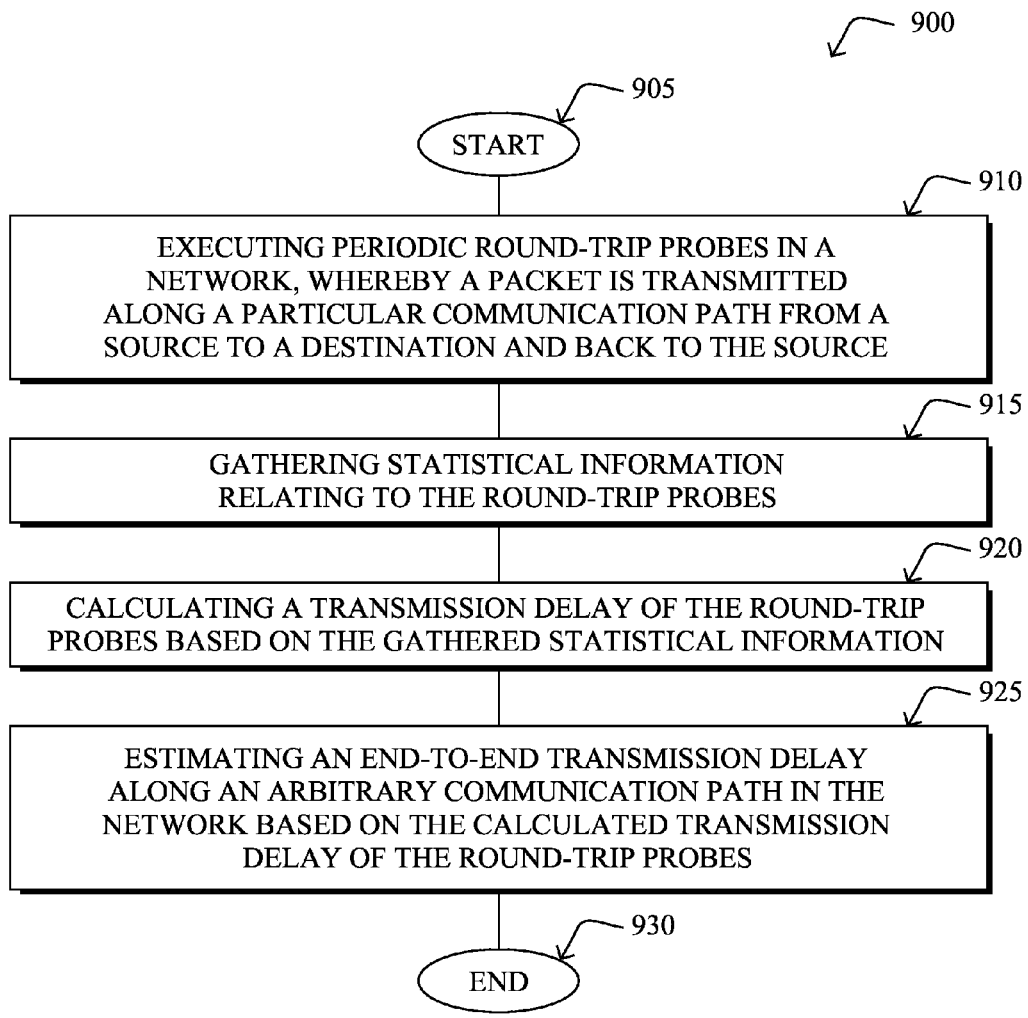
FIG. 9 illustrates an example simplified procedure for learning end-to-end delays in computer networks from sporadic round-trip delay probing.

FIG. 9 illustrates an example simplified procedure for a predictive learning machine-based approach to detect traffic outside of service level agreements. The procedure 900 may start at step 905, continue to step 910, and so forth.

At step 910, periodic round-trip probes are executed in a network, whereby a packet is transmitted along a particular communication path from a source to a destination and back to the source. At step 915, statistical information relating to the round-trip probes is gathered, and at step 920, a transmission delay of the round-trip probes is calculated based on the gathered statistical information. Also, at step 925, an end-to-end transmission delay along an arbitrary communication path in the network is estimated based on the calculated transmission delay of the round-trip probes. The procedure 900 may illustratively end at step 930. The techniques by which the steps of procedure 900 may be performed, as well as ancillary procedures and parameters, are described in detail above.

It should be noted that the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for learning end-to-end delays in LLNs from sporadic round-trip delay probing. In particular, the techniques herein have several critical advantages: (i) even for estimating round-trip delays, they perform better than a simple regression because they increase the amount of data and decrease the non-linear effects due to the presence of multiple links with very different properties, (ii) they enable the integration of link-specific data such as link quality, traffic, RSSI, etc., and (iii) they enable the estimation of end-to-end delays for arbitrary paths in the network, even those that have never been probed before, owing to the use of an underlying regression model.

Illustratively, each of the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

While there have been shown and described illustrative embodiments that provide for learning-machine-based predictive and proactive computer networking and associated monitoring, generally, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    sending, by a device in a network, periodic round-trip probes in the network, wherein a packet is transmitted along a particular communication path from a source to a destination and back to the source;
    gathering, by the device, statistical information relating to the round-trip probes;
    calculating, by the device, a transmission delay of the round-trip probes based on the gathered statistical information; and
    estimating, by a learning machine algorithm executing on the device, an end-to-end transmission delay along any arbitrary communication path in the network, even communication paths which have not been probed, based on the calculated transmission delay of the round-trip probes.

2. The method as in claim 1, further comprising:
    estimating a transmission delay of an arbitrary communication link in the arbitrary communication path based on the calculated transmission delay of the round-trip probes, wherein the arbitrary communication path is composed of one or more communication links.

3. The method as in claim 1, further comprising:
    obtaining time-stamps from packets in the network; and
    estimating a one-way transmission delay along an arbitrary communication path in the network based on the calculated transmission delay of the round-trip probes and the obtained time-stamps.

4. The method as in claim 1, wherein the learning machine algorithm is a learning machine-based link-wise estimation algorithm.

5. The method as in claim 4, further comprising:
    measuring a real transmission delay in the network; and
    refining the estimation algorithm based on the measured real transmission delay.

6. The method as in claim 4, wherein the estimation algorithm uses an expectation-maximization scheme and an underlying regression model.

7. The method as in claim 1, further comprising:
    sending a probe to one or more nodes in the network, the probe causing the one or more nodes to report a measured transmission delay local to the one or more nodes.

8. The method as in claim 7, further comprising:
    defining a schedule by which the one or more nodes report the measured transmission delay.

9. The method as in claim 7, further comprising:
    determining a node of the one or more nodes that is important in relation to the one or more nodes based on an amount of information available to the node; and
    sending a first probe to the node that is important.

10. The method as in claim 7, further comprising:
    defining a trigger mechanism which, when satisfied, cause the probe to be sent to a particular node of the one or more nodes; and
    in response to the trigger mechanism being satisfied, sending the probe to the particular node.

11. An apparatus, comprising:
    one or more network interfaces that communicate with a network;
    a processor coupled to the one or more network interfaces and configured to execute a process; and
    a memory configured to store program instructions which contain the process executable by the processor, the process comprising:
        executing periodic round-trip probes in the network, whereby a packet is transmitted along a particular communication path from a source to a destination and back to the source;
        gathering statistical information relating to the round-trip probes;
        calculating a transmission delay of the round-trip probes based on the gathered statistical information; and
        estimating, via a learning machine algorithm, an end-to-end transmission delay along any arbitrary communication path in the network, even communication paths which have not been probed, based on the calculated transmission delay of the round-trip probes.

12. The apparatus as in claim 11, wherein the process further comprises:
    estimating a transmission delay of an arbitrary communication link in the arbitrary communication path based on the calculated transmission delay of the round-trip probes, wherein the arbitrary communication path is composed of one or more communication links.

13. The apparatus as in claim 11, wherein the process further comprises:
    obtaining time-stamps from packets in the network; and
    estimating a one-way transmission delay along an arbitrary communication path in the network based on the calculated transmission delay of the round-trip probes and the obtained time-stamps.

14. The apparatus as in claim 11, wherein the learning machine algorithm is a learning machine-based link-wise estimation algorithm.

15. The apparatus as in claim 14, wherein the process further comprises:

measuring a real transmission delay in the network; and refining the estimation algorithm based on the measured real transmission delay.

16. The apparatus as in claim 14, wherein the estimation algorithm uses an expectation-maximization scheme and an underlying regression model.

17. The apparatus as in claim 11, wherein the process further comprises:

sending a probe to one or more nodes in the network, the probe causing the one or more nodes to report a measured transmission delay local to the one or more nodes.

18. The apparatus as in claim 17, wherein the process further comprises:

defining a schedule by which the one or more nodes report the measured transmission delay.

19. The apparatus as in claim 17, wherein the process further comprises:

determining a node of the one or more nodes that is important in relation to the one or more nodes based on an amount of information available to the node; and sending a first probe to the node that is important.

20. The apparatus as in claim 17, wherein the process further comprises:

defining a trigger mechanism which, when satisfied, cause the probe to be sent to a particular node of the one or more nodes; and in response to the trigger mechanism being satisfied, sending the probe to the particular node.

21. A tangible non-transitory computer readable medium storing program instructions that cause a computer to execute a process, the process comprising:

executing periodic round-trip probes in a network, whereby a packet is transmitted along a particular communication path from a source to a destination and back to the source;

gathering statistical information relating to the round-trip probes;

calculating a transmission delay of the round-trip probes based on the gathered statistical information; and estimating, via a learning machine algorithm, an end-to-end transmission delay along any arbitrary communication path in the network, even communication paths which have not been probed, based on the calculated transmission delay of the round-trip probes.

* * * * *